No. 820,220. PATENTED MAY 8, 1906.
C. W. LEVALLEY.
SET COLLAR FOR SHAFTS.
APPLICATION FILED DEC. 13, 1905.
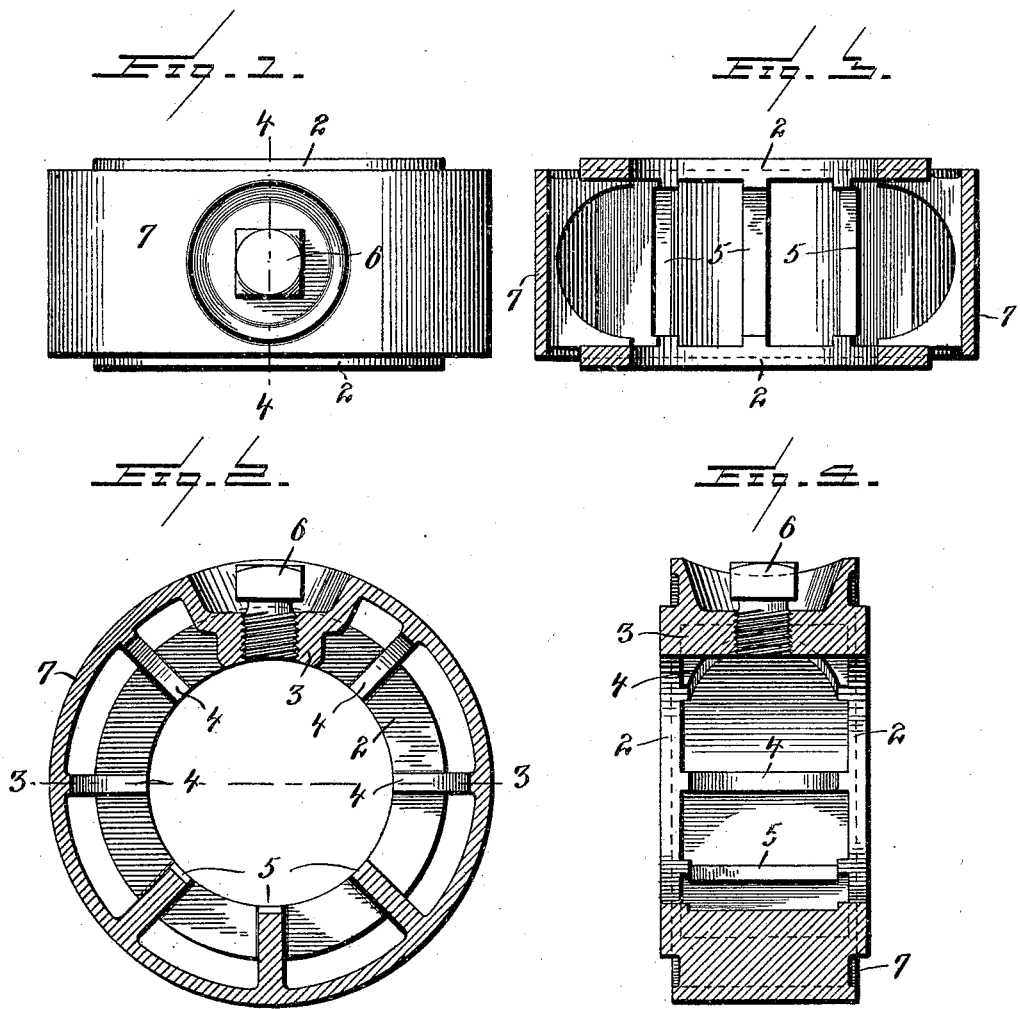
WITNESSES:
INVENTOR
Christopher W. Levalley
By
Attorney

UNITED STATES PATENT OFFICE.

CHRISTOPHER W. LEVALLEY, OF MILWAUKEE, WISCONSIN.

SET-COLLAR FOR SHAFTS.

No. 820,220. Specification of Letters Patent. Patented May 8, 1906.

Application filed December 13, 1905. Serial No. 291,597.

*To all whom it may concern:*

Be it known that I, CHRISTOPHER W. LEVALLEY, a citizen of the United States, residing at Milwaukee, in the county of Milwaukee and State of Wisconsin, have invented new and useful Improvements in and Relating to Set-Collars for Shafts, of which the following is a specification.

My invention has for its object to produce a set-collar or slip-collar for shafting that is of light construction and may be perfectly balanced and at the same time possess great strength.

In the accompanying drawings, Figure 1 is an end elevation of a set-collar embodying my improvements. Fig. 2 is a transverse sectional view of the same. Fig. 3 is a longitudinal sectional view taken on the line 3 3 of Fig. 1. Fig. 4 is a longitudinal sectional view taken on the line 4 4 of Fig. 1.

The set-collar consists, essentially, of a pair of rings 2 2, internally shaped to fit the shaft to which the collar is applied and separated from each other a distance equal to the desired thickness of the collar. These rings are connected by spoke-like radiating pieces 3 4 5. These parts constitute a skeleton hub or collar, the bearing members that engage with the shaft being the rings 2, that are quite widely separated. As will be understood, the outer faces of these rings are smooth and shaped to constitute abutting faces. One of the radiating spoke-like connecting parts 3 is relatively large and is provided with a screw-threaded aperture that constitutes the seat for the set-bolt 6, that is employed to secure the collar in place upon the shaft. A sufficient number of connecting-pieces 4 and 5 are employed in addition to the part 3 to give the necessary strength to the collar. Those spoke-like parts 5 that are diametrically opposite the part 3, in which is seated the said bolt, are so constructed and disposed as to counterbalance the part 3, while the connecting parts 4 are disposed to counterbalance each other. The relatively heavy ring-connecting part 3 may be counterbalanced by making the opposite connecting parts 5 heavy or by increasing their number or by combining these features. The latter arrangement is the one I prefer and is indicated in the drawings. The requisite weight is imparted to the spoke-like connecting parts 5 by extending them straight across from ring to ring, whereas the connecting parts 4 are made lighter by forming a thrust-bearing or set-collar that would meet many of the requirements for an article of this character; but it would be liable to catch and wind upon itself any loose article that might come in engagement therewith, for which reason I prefer to construct the collar with a peripheral flange or rim 7. To support this rim, I prefer to extend the ring-connecting parts 3 4 5 outward beyond the edges of the rings and to unite the rim to their outer ends. I thus produce a pulley-like thrust-bearing of skeleton construction that is light, strong, and perfectly balanced.

What I claim, and desire to secure by Letters Patent, is—

1. A set-collar comprising a pair of rings internally shaped to fit the shaft to which the collar is applied, these rings being spaced apart, and a series of spoke-like connecting parts arranged between said rings and uniting them, one of said parts being provided with a seat for the set-bolt, substantially as set forth.

2. A set-collar comprising a pair of rings internally shaped to fit the shaft to which the collar is applied, these rings being spaced apart, and a series of spoke-like connecting parts arranged between said rings and uniting them, one of said ring-connecting parts being enlarged and provided with a seat for a set-bolt and the diametrically opposite connecting parts being constructed to counterbalance the part in which the set-bolt is seated, substantially as set forth.

3. A set-collar of skeleton construction comprising a pair of separated rings that fit the shaft, spoke-like or radiating parts connecting the rings and extending beyond their outer edges, and a peripheral rim supported upon the ends of the said spoke-like connecting parts, substantially as set forth.

4. A set-collar for shafting having opposite abutting faces, radiating spoke-like parts extending outward beyond the edges of such faces, and a peripheral rim supported on the ends of said radiating parts, substantially as set forth.

5. A set-collar comprising a pair of rings 2 shaped to fit the shaft and spaced apart, the radiating connecting parts 3, 4, 5, situated between and uniting the rings, the part 3 being provided with a seat for the set-bolt, the parts 4 being disposed to counterbalance the part 3 and the parts 5 disposed to counterbalance each other, and the peripheral rim 7 supported upon the ends of the connecting parts beyond the outer edges of the rings 2, substantially as set forth.

CHRISTOPHER W. LEVALLEY.

Witnesses:
VLASTA I. KLOFANDA,
WM. C. SARGENT.